July 18, 1972             K. C. HOU             3,677,799

VAPOR PHASE BORON DEPOSITION BY PULSE DISCHARGE

Filed Nov. 10, 1970             3 Sheets-Sheet 1

INVENTOR,
KENNETH C. HOU

July 18, 1972     K. C. HOU     3,677,799
VAPOR PHASE BORON DEPOSITION BY PULSE DISCHARGE
Filed Nov. 10, 1970     3 Sheets-Sheet 2

INVENTOR,
KENNETH C. HOU

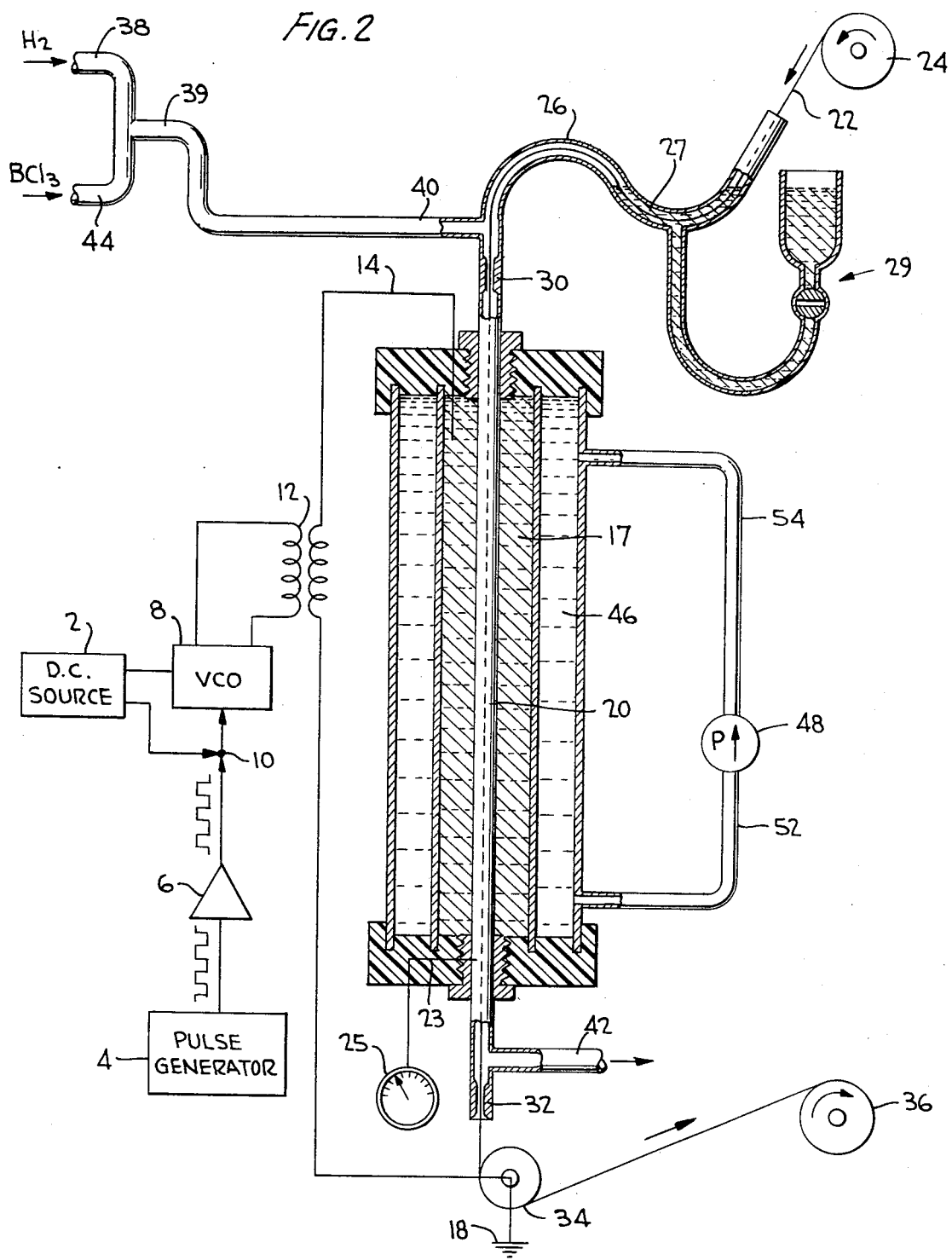

United States Patent Office 3,677,799
Patented July 18, 1972

3,677,799
VAPOR PHASE BORON DEPOSITION BY
PULSE DISCHARGE
Kenneth C. Hou, Whippany, N.J., assignor to Celanese
Corporation, New York, N.Y.
Filed Nov. 10, 1970, Ser. No. 88,358
Int. Cl. C23c 13/00
U.S. Cl. 117—93.1 R                                    17 Claims

ABSTRACT OF THE DISCLOSURE

A process is provided for the low temperature deposition of a boron coating upon a substrate comprising providing a gaseous mixture of hydrogen and a boron compound in a coating zone containing the substrate and applying sufficient high frequency electrical energy to the zone in pulsed form to establish a boron-hydrogen excited gas species therein capable of imparting the desired boron coating to the substrate.

BACKGROUND OF THE INVENTION

This invention relates to a new and improved method for the boron coating of materials by deposition thereof from a gaseous atmosphere, particularly from an excited gaseous suspension or plasma of activated particles wherein at least a portion of the particles are in an ionized state. One of the most promising materials concepts which has evolved in recent years out of the aerospace materials technology is that of boron filament-reinforced composite structures. The incorporation of boron filamentary material in a suitable matrix as a reinforcing medium is capable of yielding a composite structure with the strength of high strength steel, the rigidity of beryllium, and the density of magnesium. Consequently, much effort has been expended on the development of commercially feasible fabrication techniques for such structures. The resulting composites may be employed as structural components, or in any other application where a strong lightweight material is required. See, e.g., U.S. Pat. No. 3,491,055, cols. 3–5 for a disclosure of various boron filament composites.

Most of the present techniques for boron filament production utilize chemical vapor deposition procedures wherein a boron coating is applied to a filamentary substrate. For example, it is known to heat a wire substrate by resistance heating sufficiently to cause vaporized boron to deposit thereon. See, e.g., U.S. Pats. 1,774,410; 3,365,-330; and 3,409,469. However, very high temperatures in the range of 1000 to 2000° C. are commonly required when such a technique is used, with the consequent limitations that only substrates (e.g. tungsten wire) and equipment that can withstand such high temperatures may be employed.

Another development in the art of vapor phase boron deposition to form a boron filament is represented in U.S. Pat. No. 3,386,909 which discloses that diborane may be electrically ionized to deposit a boron coating upon a substrate in the presence of a substantial vacuum. Such a technique suffers from the drawback that relatively expensive equipment is necessary to produce the required sub-atmospheric pressures.

Additionally, solid boron filaments may be formed in and electrical discharge as disclosed in U.S. Pat. No. 3,483,884. According to the process therein disclosed, hydrogen and boron trichloride are subjected to a direct current thermionic arc discharge between spaced electrodes to form a solid boron filament which is continuously withdrawn from the end of a positive electrode, using a low frequency pulsating D.C. current of 60–600 Hz. as the power source.

Other work with respect to boron deposition is reported in an article by A. E. Hultquist and M. E. Sibert entitled "The Glow Discharge Deposition of Boron" appearing in Chemical Reactions in Electrical Discharge at pp. 182–197. In accordance with the deposition technique therein described, a high voltage, low amperage, high frequency RF current is imposed across a hydrogen-boron trichloride gas mixture, which results in a high degree of ionization/activation of the gases present. Variation of current input can result in deposition at a temperature as low as room temperature, but the process suffers from the disadvantage that the boron deposition may be achieved only at a very low pressure, and the rate of deposition is low since only relatively small amounts of hydrogen and borontrichloride may be "leaked" into the coating zone.

It is an object of the invention to provide an improved boron deposition process for the production of boron-coated materials.

It is an object of the invention to provide an improved boron deposition process which is capable of producing boron-coated fibrous materials of superior tensile properties.

It is another object of the present invention to overcome the above-mentioned problems in the art of boron deposition.

It is a further object of the present invention to provide a method for the deposition of boron upon a substrate which may be conducted at relatively low temperatures and at atmospheric pressure.

It is still a further object of the invention to provide a boron deposition process wherein the temperature of the coating zone may be readily controlled.

These and other objects as well as the scope, nature, and utility of the invention will be apparent from the following description and appended claims.

SUMMARY OF THE INVENTION

It has been found that boron may be deposited upon a substrate by providing at a pressure of about 1 to 3 atmospheres a gaseous mixture of hydrogen and a boron compound in a coating zone containing the substrate, applying sufficient pulsed high frequency electrical power to the gaseous mixture to establish a boron-hydrogen excited gas species within said coating zone capable of imparting a deposit of boron upon the substrate at a temperature of from about 20° C. to about 350° C., and retaining said substrate within said coating zone until the boron coating of said substrate is substantially complete.

The pulsed electrical discharge employed in the process is capable of creating the necessary high frequency breakdown potential required to establish a hydrogen-boron plasma under substantially atmospheric pressure and at relatively low temperatures, thus obviating the need for a substrate and equipment that will tolerate the high temperature normally necessary for thermal deposition of boron compounds with hydrogen, and further obviating the need for relatively expensive equipment needed to produce sub-amtospheric pressures commonly necessary in the prior art.

DESCRIPTION OF THE DRAWINGS

FIG. 2 is a schematic diagram of an apparatus for depositing boron on a conductive substrate.

DESCRIPTION OF THE PREFERRED EMBODIMENTS

The substrate

Figure 1:
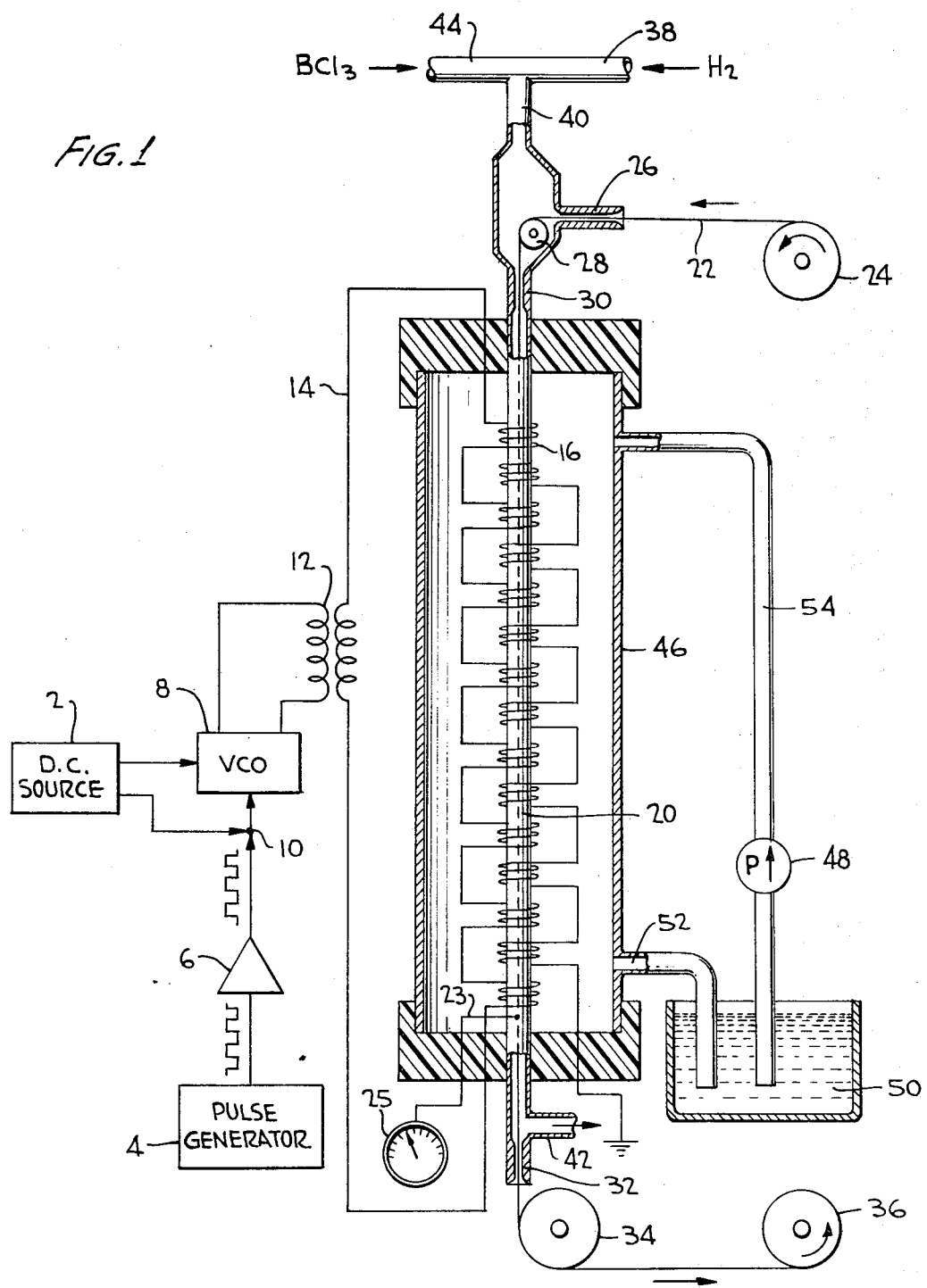
FIG. 1 is a schematic illustration of a representative apparatus capable of depositing a boron coating upon a non-conductive substrate in accordance with the present process.

The nature of the substrate which is coated with boron in accordance with the present process may be varied widely and may be either electrically conductive or electrically non-conductive. For instance, suitable electrically non-conductive substrates include the silicious and polymeric materials. Illustrative examples of suitable silicious materials include glass, quartz, silicon carbide, and the silicone polymers exhibiting a melting point above the temperature employed in the coating zone. A sapphire substrate may also be selected.

In general, any of the synthetic polymeric materials such as polyolefins, polyesters, polyamides, polyacrylics, polybenzimidazoles, etc. which have a melting point or decomposition point above the temperature employed in the coating zone are likewise suitable for use as substrates in the process of the present invention. Specific examples of such materials are polyethylene, polyethylene terephthalate, nylon 66, polyacrylonitrile, poly-2,2'-m-phenylene - 5,5'-bibenzimidazole, etc.

The invention may also be used with conductive substrates, such as metals, materials containing electrically conductive carbon (e.g. graphite), etc. Alternatively, semiconductor substrates may be selected, e.g. a thermally stabilized acrylic polymeric material commonly identified as "black Orlon" fiber.

The physical configuration of the substrate employed in the present process may be varied widely. When the resulting boron coated article is to be employed as a reinforcing medium in a composite article, it is preferred that the substrate posess a fibrous configuration. In a particularly preferred embodiment of the process the substrate is provided as a continuous length of fibrous material, e.g. a single filament, multifilament yarn, tow, tape, strand, or similar fibrous assemblage. Alternatively, the substrate may possess a relatively flat surface.

Particularly preferred electrically non-conductive substrates are multifilament yarns of an acrylonitrile homopolymer, or fiber glass.

Particularly preferred electrically conductive substrates are wires of tungsten, iron, copper, aluminum, stainless steel, Nichrome nickel alloy, and multifilament carbon yarns containing a substantial quantity of graphitic carbon.

The gaseous mixture

Within the coating zone (described hereafter) containing the substrate to be boron coated is provided a gaseous mixture of hydrogen and a boron compound. The specific boron compound selected for use in the process may be varied widely provided the boron compound is capable of being maintained as a gas under the coating conditions employed.

In a preferred embodiment of the process the boron compound selected is a boron trihalide, i.e. boron trichloride, boron tribromide, and boron trifluoride. When the coating zone is bounded by glass walls, it is recommended, however, that boron trichloride or boron tribromide be employed rather than boron trifluoride.

Any alkyl borate which is capable of existing as a gas in the coating zone may be selected for use in the process. The preferred alkyl borates are of the formula $B(OR)_3$, where R is an alkyl group having 1 to 5 carbon atoms. Such alkyl borates include: trimethyl borate, $B(OCH_3)_3$ sometimes identified as methyl borate, or trimethoxyborine; triethyl borate, $B(OC_2H_5)_3$; tripropyl borate, $B(OC_3H_7)_3$; triisopropyl borate, $B[O(CH_3)_2CH]$; tributyl borate, $B(OC_4H_9)_3$; and triamyl borate, $B(OC_5H_{11})_3$. The particularly preferred alkyl borate for use in the process is trimethyl borate. Other alkyl borates include the higher molecular weight boric acid esters such as tricyclohexyl borate, $B(OC_6H_{11})_3$; tridodecyl borate, $B(OC_{12}H_{25})_3$; trihexylene glycol biborate, $B_2(O_2C_6H_{12})_3$.

Boron compounds such as diborane, $B_2H_6$; pentaborane, $B_5H_9$; decaborane, $B_{10}H_{14}$; and the like may alternatively be selected.

The hydrogen gas of the gaseous mixture serves as a reducing agent which upon excitation (as described hereafter) aids in the reduction of the boron atoms of the boron compound to essentially pure elemental boron which is deposited upon the substrate provided in the coating zone as an essentially homogeneous coating. The relative quantities of the boron compound to hydrogen in the gaseous atmosphere of the coating zone are preferably adjusted so that the molar ratio of boron to hydrogen is about 1:2 to about 1:5, and is about 1:3 in a particularly preferred embodiment of the process. The gaseous mixture may be premixed prior to introduction into the coating zone (described hereafter), or alternatively formed in the coating zone upon the introduction of separate gas streams. It is recommended that the gaseous atmosphere within the coating zone be either intermittently or continuously replenished (e.g. by the continuous introduction of a fresh gas supply). In a further embodiment of the process the substrate is preliminarily passed through a zone containing the boron compound wherein the boron compound becomes physically absorbed upon the same prior to introduction into the coating zone wherein the requisite reduction to essentially elemental boron is carried out as described. In such embodiment the boron compound which is initially absorbed upon the substrate when exposed to the high frequency electrical power in pulsed form undergoes at least partial volatilization and the desired reaction.

Application of the boron coating

The boron coating is applied to the substrate upon contact with an excited gas species formed through the application pulsed high frequency electrical power to the gaseous mixture present within the coating zone. The substrate may be statically suspended or otherwise positioned within the coating zone. In a preferred embodiment of the process in which the substrate is a continuous length of fibrous material, the substrate is continuously passed through the coating zone in the direction of its length. For instance, a rotating feed roll may be provided at the entrance end of the coating zone, and a rotating take-up roll may be provided at the exit end of the coating zone.

The coating zone may be bounded by walls constructed of either a conductive or a non-conductive material. For instance, a tubular chamber constructed of transparent glass may be conveniently selected to define the bounds of the coating zone. In such an arrangement a continuous length of fibrous material may be axially suspended therein with free access of its surface to the excited gas species provided.

Figure 1A:
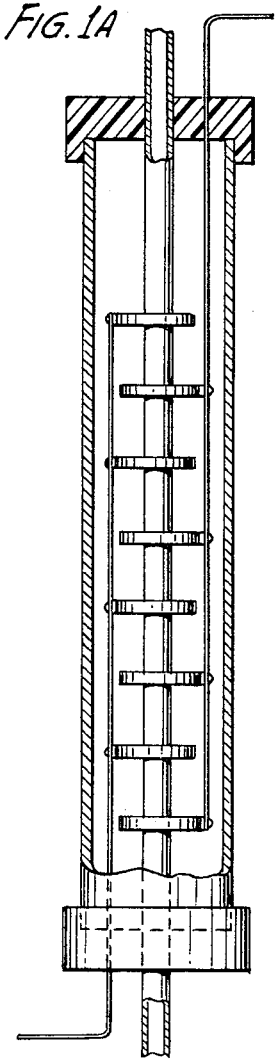
FIGS. 1A and 1B are schematic illustrations of means for capacitively exciting the gaseous mixture in the reaction chamber of FIG. 1.
Figure 1B:
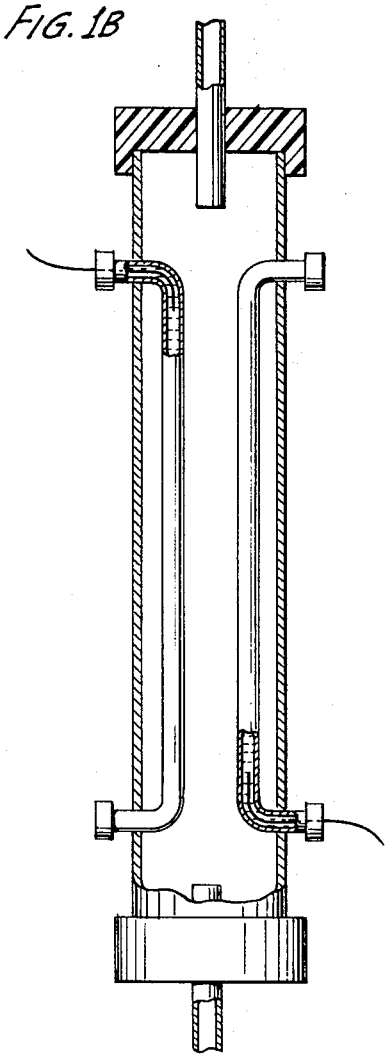
Figure 1C:
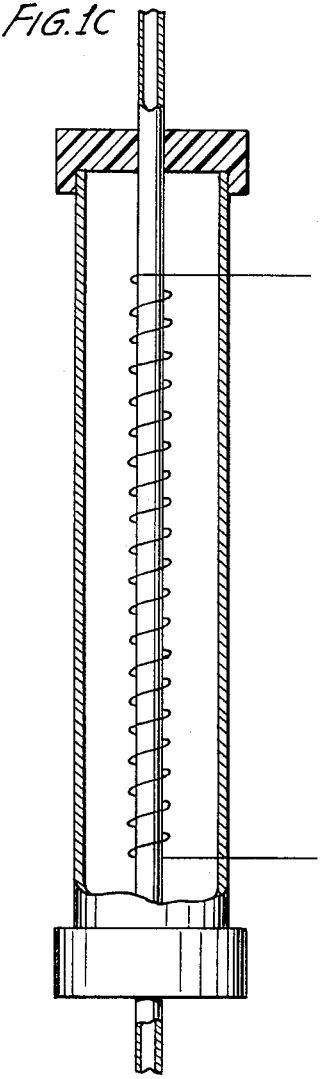
FIG. 1C is a schematic illustration of means for inductively exciting the gaseous mixture in the reaction chamber of FIG. 1.

The excited gas species required to produce the requisite coating may be formed by inductively or capacitively coupling pulsed high frequency electric power to the gaseous atmosphere. As shown in FIG. 1 (described in detail hereafter), the gaseous mixture within the coating zone may be capacitively excited. Representative apparatus arrangements wherein capacitive coupling also may be utilized are shown in FIG. 1A, FIG. 1B, and FIG. 2 (described in detail hereafter). In FIG. 1A the pulsed high frequency electrical power is applied to metallic rings which are oriented perpendicularly to the axis of an elongated coating zone and effectively surround the same. In FIG. 1B the pulsed high frequency electrical power is applied to a pair of mercury filled tubes oriented parallel to the axis of an elongated coating zone and positioned within the same. In FIG. 1C pulsed high frequency electrical power is inductively applied to an elongated coating zone through the use of a single coil which completely surrounds the same.

The term "pulsed" electrical power or electrical power "in pulsed form" as used herein is defined as pulses or bursts of high frequency electrical energy, e.g. pulsed RF energy. The power may be an A.C. signal having an amplitude of about 500 v. to 10 kv. peak-to-peak and a frequency of about 0.5 kHz. to 2500 mHz. (preferably 1.0 kHz. to 30 mHz.). The pulses may be from about 0.1 to 1000 microseconds duration. The pulse repetition rate may be from about 0.1 to 20 kHz. (preferably about 1.0 to 10 hHz.). The pulsed electrical power may be provided in accordance with techniques known to those skilled in the electrical arts, e.g. by gating a high frequency oscillator or klyston on and off to generate "bursts" of high frequency energy. The dimensions of the coating zone will influence the power requirement as will be apparent to those skilled in the art.

In a preferred embodiment of the process the gaseous mixture present within the coating zone is conveniently maintained at substantially atmospheric pressure thereby eliminating the need to maintain the same at reduced pressure conditions. Alternatively, the process may be operated at super-atmospheric pressures, e.g. up to about 3 atmospheres. At pressures substantially below atmospheric the boron deposition rate becomes inordinately slow. At pressures much above about 3 atmospheres there is a tendency for a non-uniform boron coating to be deposited.

The high frequency electrical power in pulsed form is applied to the gaseous atmosphere in sufficient quantity to establish a boron-hydrogen excited gas species while maintaining the temperature of said coating zone at about 20 to 350° C., and preferably at about 40 to 80° C. The temperature of the coating zone additionally is maintained below that temperature at which the properties of the substrate are adversely influenced. For instance, if the substrate is a synthetic polymeric material, the temperature of the coating zone should not exceed the melting point or the decomposition point of the same. It has been observed that the substrate present in the coating zone may assume a slightly more elevated temperature than the gaseous atmosphere because of the recombination reaction occurring at the surface of the substrate.

If desired, the maintenance of the desired temperature may be aided by immersion of the coating zone in a low dielectric liquid bath, such as silicon oil.

A representative apparatus arrangement for carrying out the boron coating process of the invention is illustrated in FIG. 1. With reference to FIG. 1, the power unit includes a conventional variable D.C. power supply 2, a conventional pulse generator 4 having a variable pulse repetition rate and a variable pulse width, a conventional signal amplifier 6, and a variable frequency oscillator 8. The output signal from the pulse generator 4 is applied to the oscillator 8 by way of the signal amplifier 6. Both a variable positive D.C. voltage and a fixed negative bias voltage from the power supply 2 are applied to the oscillator 8.

The power supply 2 may be any conventional variable D.C. power supply, and is preferably a "Kepco" Model 615B, 0–600 volt and negative 150 volt power supply. The pulse generator 4 may be any conventional pulse generator of variable pulse repetition rate, preferably a Hewlitt Packard Model 3300A pulse generator, which provides pulses having a variable pulse repetition rate and either a constant or a selectably variable pulse width or duration. The amplifier 6 may be any conventional amplifier having an odd number of stages which amplifies and inverts the pulses from the pulse generator 4 and provides positive output pulses, e.g. of approximately 150 volts in amplitude. The oscillator 8 may be any conventional variable high frequency oscillator which generates an output signal in the radio frequency range, preferably above 1.0 kHz., and which is capable of being gated or pulsed on and off to provide "bursts" of high frequency energy. In a preferred operation of the power unit this is accomplished by "cutting off" the oscillator by applying a negative 150 volt bias to the control grid of an oscillator tube (not shown) by way of an input terminal 10 and by periodically applying positive pulses to the input terminal 10 and thus the control grid of sufficient amplitude to drive the oscillator tube into conduction.

In operation, the pulse generator 4 generates a series of negative going pulses, the pulse repetition rate and/or the pulse width of which may be varied to thereby vary the reoccurrence rate and/or the duration of the pulses. The signal from the pulse generator 4 is amplified and inverted by the amplifier 6 and the positive pulses from the amplifier 6 are applied to the oscillator 8. In the absence of a pulse from the amplifier 6, the oscillator 8 is cut off and does not provide an output signal. However, when a pulse from the pulse generator 4 is applied to the oscillator 8 by way of the amplifier 6, the oscillator 8 breaks into high frequency oscillations and provides an output signal for the duration of the applied pulse. The resultant pulsed high frequency signal may be coupled to the coating zone 20 through a conventional output transformer 12, the primary winding of which may be utilized for both signal coupling and as a portion of the oscillator tank circuit. Lead 14 connects the transformer 12 to coil 16.

The amplitude of the output signal from the oscillator 8 may be varied by varying the voltage directly applied to the oscillator 8 from the power supply 2. The frequency of the output signal from the oscillator 8 may, of course, be varied in any suitable conventional manner, e.g. by varying the reactive value of an electrical component in a tank circuit (not shown). In addition, the relationship between the "on" time and the "off" time of the output signal and the duration of the pulses of high frequency energy may be varied by adjusting the pulse repetition rate and/or width of the output pulses from the pulse generator 4. The pulse unit is thus capable of supplying bursts of electrical energy of a variable high frequency, the bursts occurring at a selectable burst repetition rate and having a variable burst width or duration.

Another representative pulsing unit which may be used to provide the pulsed high frequency signal to excite the gas mixture in the coating zone is a Lepel Model No. T–5–3 high frequency power unit capable of delivering up to a 10 kv. signal at a frequency of up to 30 mHz. pulsed by a grid pulse modulator Model 1414 available from Pulse Tronics Engineering Co.

By providing a pulsed frequency signal as described above, excessive heat buildup within the coating zone 20 may be prevented through variation of the pulse repetition rate, the pulse width or duration, or both of these parameters. The heat generated within the reaction chamber during the application of pulsed high frequency signal is allowed to dissipate to a great extent during the off period of the oscillator, i.e. between pulses of high frequency energy.

Since the signal amplitude, frequency, duration and repetition rate required for initiating and maintaining the process depend on the diameter and length of the coating zone, as well as the flow rate of the gas, such parameters may vary widely. The temperature inside the coating zone 20 may be sensed by a thermocouple 23 and a visual temperature indication may be provided at meter 24. The temperature within the coating zone 20 may thus be easily regulated by visually monitoring the meter 25 and adjusting the pulse repetition rate and/or the pulse width and/or the duration of the high frequency signal. The intensity of the excitation is controlled by the amplitude and duration of the pulses, the pulse repetition rate, the space gap between the electrodes, and total length of the coating zone.

With a reaction zone or chamber of approximately 12 cm. in length and 3 mm. in diameter, the process may be conveniently practiced utilizing a pulsed high frequency output signal from the oscillator 8 in the radio frequency range above 1.0 kHz., the particularly preferred range being from 1.0 kHz. to 15 mHz. The signal may be pulsed at a repetition rate of from about 0.5 to about 100 kHz. (0.5 to 50 kHz. being preferred) while the pulse width may be from 0.1 to 1000 microseconds (0.1 to 500 microseconds being preferred). The amplitude of the pulsed high frequency signal may be from 500 v. to 10 kv. (1 to 3 kv. being preferred).

The following examples are given as specific illustrations of the process of the invention. It should be understood, however, that the invention is not limited to the specific details set forth in the examples.

EXAMPLE I

This example illustrates an embodiment of the invention wherein the substrate is a non-conductive polymeric material and the boron deposition is conducted continuously.

Reference is made to the apparatus of FIG. 1.

A polyacrylonitrile homopolymer continuous filament yarn 22 of 800 fils having a total denier of 700 and a decomposition point of about 310° C. was passed via rotating feed roll 24 into neck 26, around pulley 28, through coating zone 20 via annular guides 30 and 32, around pulley 34, and ultimately taken up upon rotating uptake roll 36.

The coating or reaction zone 20 was defined by tubular glass of 3 mm. diameter and 12 cm. length. Hydrogen gas was introduced via inlet tubes 38 and 40 at a rate of 200 cc. per minute. Off gases were exited via exit tube 42. A 3000 v. peak-to-peak A.C. signal having a frequency of 13.6 mHz. was applied to the reactor in pulses of 100 microseconds duration at a p.r.r. (pulse repetition rate) of 1.0 kHz. A glow of hydrogen was established. The breakdown potential required to establish a hydrogen "plasma" at atmospheric pressure was of the order of $1 \times 10^4$ volts/cm.

By adjusting the pulsed high frequency signal parameters such as amplitude, frequency and on/off time, the hydrogen plasma may be confined around the substrate 22. More specifically, the hydrogen plasma was so confined by exciting the gas with a 3000 v. peak-to-peak A.C. signal having a frequency of 13.6 mHz., the A.C. signal being applied in pulses of 100 microseconds duration at a p.r.r. of 1.0 kHz.

Boron trichloride was then introduced in vapor form via inlet tubes 44 and 40 at a rate of 40 cc. per minute, and was mixed with the hydrogen stream. The boron trichloride to hydrogen molar ratio was about 1:5. The parameters of the applied A.C. signal remained at 3000 v. peak-to-peak having a frequency 13.6 mHz. The A.C. signal was applied in pulses of 100 microseconds duration at a p.r.r. of 1.0 kHz. to prevent thermal buildup.

During the discharge the entire reactor unit was immersed in a cooling bath 46 of silicone oil, which was kept in circulation by a pump 48 connected to reservoir 50 via lines 52 and 54.

A boron-hydrogen excited gas species or "plasma" was indicated by a visible glow within coating zone 20, and boron began depositing on the substrate. The mean residence time of the substrate 22 in the coating zone 20 was 5 minutes. The temperature in the coating zone 20 was measured by thermocouple 23 and indicated on meter 25. The maximum temperature reached inside the coating zone was 60° C. Examination of the substrate indicated a smooth, firmly adhering layer of boron 1 to 2 mils in thickness.

EXAMPLE II

Example I was repeated in a batch process with the exceptions indicated.

The polymeric yarn substrate 22 was allowed to remain stationary in the coating zone 20, while changing the parameters of the A.C. signal, after the introduction of boron trichloride, to 3000 v. peak-to-peak at a frepency of 3.0 mHz. Thermal buildup was prevented by applying the A.C. signal in pulses of 10.0 microseconds duration at a p.r.r. of 10.0 kHz. The coating zone was maintained at a relatively constant temperature of about 50° C., well below the decomposition point of the substrate.

After 5 minutes, the substrate was removed and examined for boron deposition. A smooth, firmly adhering layer of boron 1 to 2 mils in thickness was exhibited.

EXAMPLE III

This example illustrates an embodiment of the invention wherein the substrate is an electrically conductive material and the boron deposition is conducted continuously.

Reference is made to the apparatus shown in FIG. 2, in which like numerals designate identical components to those previously described in connection with FIG. 1.

A pure tungsten wire 22 having a diameter of about 1.0 mil was passed through the coating zone as described in FIG. 1, with the exception that it was initially passed through a mercury seal 27 supplied from reservoir 29.

The gases were excited by means of the capacitance between a mercury jacket 17 encircling the coating zone 20 and the electrically grounded wire substrate.

Hydrogen was introduced at the rate of 200 cc. per minute. A Pulse Tronics pulse generator was used to control a Lepel Model T-5-3 high frequency signal generator to provide a 3000 v. peak-to-peak A.C. signal at a frequency of 10 mHz. in pulses of 500 microseconds duration at a p.r.r. 10 kHz. The established hydrogen plasma was confined to the immediate area of the substrate.

Boron trichloride was premixed in line 39 with hydrogen and introduced into the coating zone at a rate of 40 cc. per minute. The boron to hydrogen molar ratio was about 1:5. The parameters of the A.C. signal were maintained 3000 v. peak-to-peak at a frequency of 10 mHz. Thermal buildup was prevented by applying the A.C. signal in pulses of 500 microseconds duration at a p.r.r. of 10 kHz.

Upon the establishment of a boron-hydrogen plasma, boron began to deposit upon the wire substrate. The mean residence time of the substrate within the coating zone was 5 minutes. The temperature inside the coating zone was regulated as in Example I, resulting in a relatively constant temperature within coating zone 20 of about 60° C. Examination of the wire substrate revealed a tenaciously adhering, rather smooth coating of boron of about 2 to 3 mils in thickness.

EXAMPLE IV

Example III was repeated in a batch process with the exceptions indicated.

The tungsten wire substrate was allowed to remain stationary in the coating zone. After introduction of boron trichloride an A.C. signal at 3000 v. peak-to-peak and a frequency of 10 mHz. was coupled to the coating zone. Thermal buildup was prevented by applying the A.C. signal in pulses of 200 microseconds duration at a p.r.r. of 10 kHz. Similar results were achieved after 5 minutes.

EXAMPLE V

This example is illustrative of an embodiment of the process wherein the substrate is an electrically conductive carbonaceous yarn containing a substantial quantity of graphitic carbon, and the boron deposition is conducted continuously.

Reference is made to the apparatus of FIG. 2.

The substrate was a continuous filament yarn of 720 fils having a total denier of about 310. The yarn was derived from an acrylonitrile homopolymer precursor in accordance with techniques known in the art, and exhibited a predominant graphitic carbon X-ray diffraction pattern.

Hydrogen was introduced via inlet tubes 38 and 40 at a rate of 400 cc. per minute. The parameters of the pulsed high frequency A.C. signal utilized to establish a hydrogen plasma confined to the area of the substrate were: amplitude 3500 v. peak-to-peak; frequency 10 mHz.; p.r.r. 20 kHz.; and pulse width 500 microseconds.

Boron trichloride was introduced via inlet tubes 44 and 40 at the rate of 80 cc. per minute in order to establish a boron trichloride to hydrogen molar ratio of about 1:5. The parameters of the pulsed high frequency A.C. signal employed to deposit boron on the substrate were: amplitude 3500 v. peak-to-peak; frequency 10 mHz.; p.r.r. 10 kHz.; and pulse width 500 microseconds.

By adjusting the temperature as described in Example I, the temperature within the coating zone was kept below a maximum of 300° C. A firmly adhering layer of boron of about 2 mils thickness was present upon the substrate.

EXAMPLE VI

Example V was repeated in a batch process with the exceptions indicated.

The substrate was allowed to remain stationary within the coating zone employing an A.C. signal after the introduction of boron trichloride at 3500 v. peak-to-peak and a frequency of 10 mHz. Thermal buildup was prevented by applying the A.C. signal in pulses of 200 microseconds duration at a p.r.r. of 10 kHz.

The results of Examples I, III and V are summarized in Table I.

trical power in pulsed form applied to said gaseous mixture is of the radio frequency range from about 1.0 kHz. to 30 mHz.

4. A process according to claim 1 wherein the molar ratio of said boron compound to hydrogen in said gaseous mixture is about 1:2 to about 1:5.

5. A process according to claim 4 wherein said boron compound present in said gaseous mixture is boron trichloride.

6. A process according to claim 1 wherein said substrate is electrically conductive.

7. A process according to claim 6 wherein said electrically conductive substrate serves as a grounding electrode.

8. A process according to claim 1 wherein said substrate is electrically non-conductive.

9. A process according to claim 8 wherein the substrate is a synthetic polymeric material.

10. A process for the continuous deposition of a boron coating upon a substrate comprising:
    (a) providing a coating zone containing a gaseous mixture of a boron trihalide and hydrogen in a molar ratio of about 1:2 to about 1:5 at substantially atmospheric pressure,
    (b) applying an A.C. signal having an amplitude of from about 500 v. to 10 kv. peak-to-peak and a frequency of from about 0.5 kHz. to 2500 mHz. to said gaseous mixture in pulses of from about 0.1 to 100 microseconds duration at a pulse repetition rate of about 1.0 to 20 kHz. sufficient to form a boron-hydrogen excited gas species within said coating zone capable of imparting the desired boron coating to said substrate, and sufficient to mtaintain the temperature in said coating zone at a temperature of about 20 to 350° C., and
    (c) continuously passing a substrate through said coating zone for a residence time sufficient to substantially coat said substrate with boron.

TABLE I

| Example No. | Substrate | A.C. signal peak-to-peak voltage, v. | A.C. signal frequency, mHz. | Pulse width (microseconds) | P.R.R., kHz. | Maximum temperature of coating zone, ° C. | Thickness of boron coating, mils |
|---|---|---|---|---|---|---|---|
| I | Polyacrylonitrile homopolymer yarn | 3,000 | 13.6 | 100 | 1.0 | 60 | 1 to 2 |
| III | Tungsten wire | 3,000 | 10 | 500 | 10.0 | 60 | 2 to 3 |
| V | Graphite yarn | 3,500 | 10 | 500 | 10.0 | 300 | 2 |

The nature, scope, utility and effectiveness of the present invention have been described and specifically exemplified in the foregoing specification. However, it should be understood that these examples are not intended to be limiting and that the scope of the invention to be protected is particularly pointed out in the appended claims.

I claim:

1. A process for the deposition of a boron coating upon a substrate comprising:
    (a) providing at a pressure of about 1 to 3 atmospheres a gaseous mixture of hydrogen and a boron compound in a coating zone containing said substrate, and
    (b) applying high frequency electrical power in pulsed form to said gaseous mixture sufficient to establish a boron-hydrogen excited gas species within said coating zone capable of imparting a deposit of boron upon said substrate while maintaining the temperature of said coating zone at about 20 to 350° C., and
    (c) retaining said substrate within said coating zone until the boron coating of said substrate is substantially complete.

2. A process according to claim 1 wherein said gaseous atmosphere is provided at substantially atmospheric pressure.

3. A process according to claim 1 wherein said elec-

11. An process according to claim 10 in which said substrate is a continuous length of fibrous material and is continuously passed through said coating zone in the direction of its length.

12. A process according to claim 11 wherein said substrate is electrically conductive.

13. A process according to claim 12 wherein said substrate serves as a grounding electrode.

14. A process according to claim 11 wherein said substrate is a synthetic polymeric material.

15. A process according to claim 10 wherein said boron trihalide is boron trichloride.

16. A process according to claim 10 wherein said A.C. signal has an amplitude from about 500 v. to 10 kv., has a frequency of about 1.0 kHz. to 30 mHz., and is pulsed at a pulse repetition rate of about 1 to 10 kHz., and pulse duration of about 0.1 to 1000 microseconds.

17. A process according to claim 10 wherein said hydrogen and said boron trihalide are continuously introduced into said coating zone.

References Cited
UNITED STATES PATENTS

| | | | |
|---|---|---|---|
| 2,945,797 | 7/1960 | Cherrier | 204—164 |
| 3,386,909 | 6/1968 | Hough | 117—93.1 GD |
| 3,438,884 | 4/1969 | Juhola et al. | 117—93.1 R |
| 3,472,679 | 10/1969 | Ing et al. | 117—93.1 GD |
| 3,547,802 | 12/1970 | Gleit et al. | 204—164 |

ALFRED L. LEAVITT, Primary Examiner

J. H. NEWSOME, Assistant Examiner

U.S. Cl. X.R.

117—106 R; 23—209; 204—164